May 15, 1962  H. D. HAMPTON  3,034,349
SUBSURFACE FLUID METER
Filed Feb. 6, 1959
2 Sheets-Sheet 2
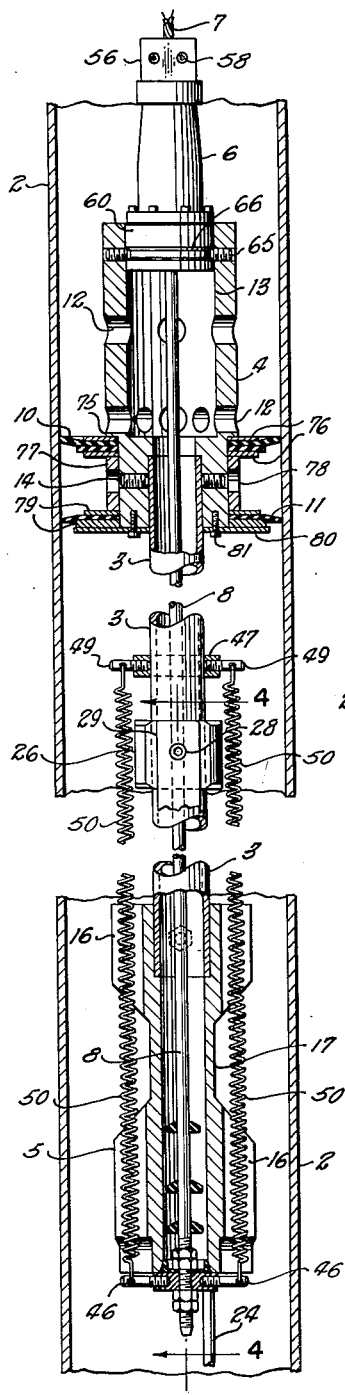
Fig. 2
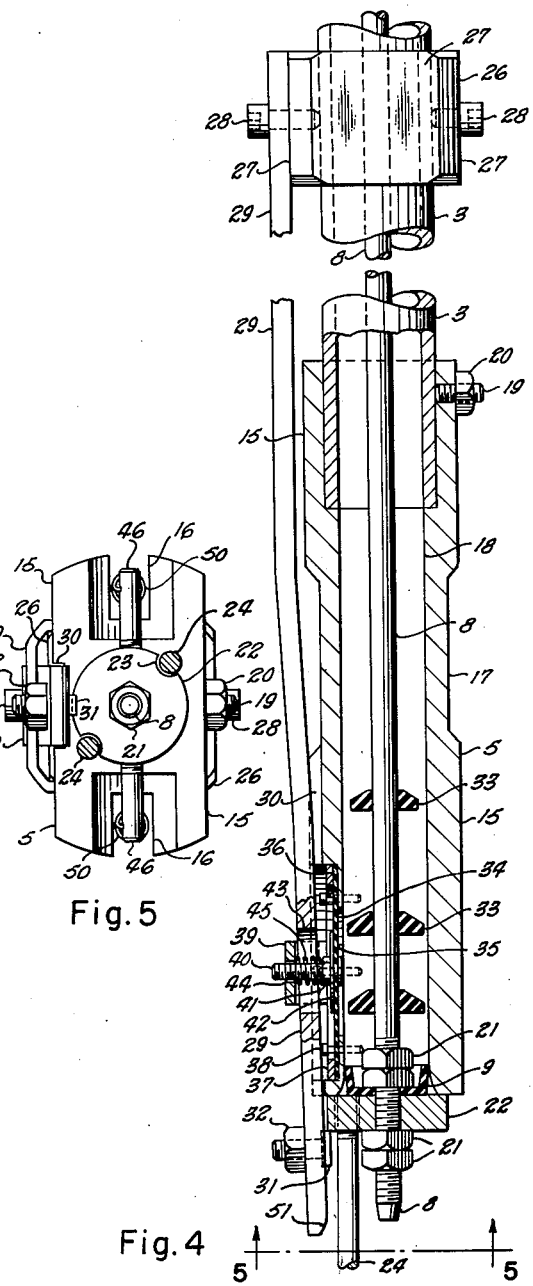
Fig. 5
Fig. 4
INVENTOR
Harry D. Hampton
BY
ATTORNEY United States Patent Office 3,034,349
Patented May 15, 1962

3,034,349
SUBSURFACE FLUID METER
Harry Donald Hampton, Wichita Falls, Tex.
(205 Clark Circle, Henrietta, Tex.)
Filed Feb. 6, 1959, Ser. No. 791,568
3 Claims. (Cl. 73—155)

This invention relates to a subsurface fluid meter, and it concerns more particularly apparatus for detecting leaks in oil well casing.

An object of the invention is to provide apparatus for detecting leaks in oil well casing which is capable of determining whether any leaks have occurred, and in addition, the location of the leaks, and the rate at which well fluids are entering the casing therefrom.

Another object of the invention is to provide a device which is capable of being lowered in an oil well casing, in place in a well bore, to any level, and having means for collecting a measured amount of well fluids entering the casing through leaks occurring therein at a higher elevation, and means for automatically dumping the collected fluids, while at the same time transmitting a signal to the surface, and thereafter repeating the operation, each time that a measured amount of fluid has been collected.

Another object of the invention is to provide a device for the purpose described which is of simple, rugged construction, may be manufactured inexpensively, and is efficient in operation and durable in use.

The invention will be readily understood by referring to the following description and the accompanying drawing, in which:

FIGURE 2 is an elevational view, on an enlarged scale, partly in section taken on a median line;

FIGURE 3 is a fragmentary sectional elevational view, on an enlarged scale, taken on a median line;

FIGURE 4 is a fragmentary sectional elevational view, on an enlarged scale, taken on the line 4—4 of FIGURE 2; and FIGURE 5 is an inverted sectional plan view, taken on the line 5—5 of FIGURE 4.

Figure 1:
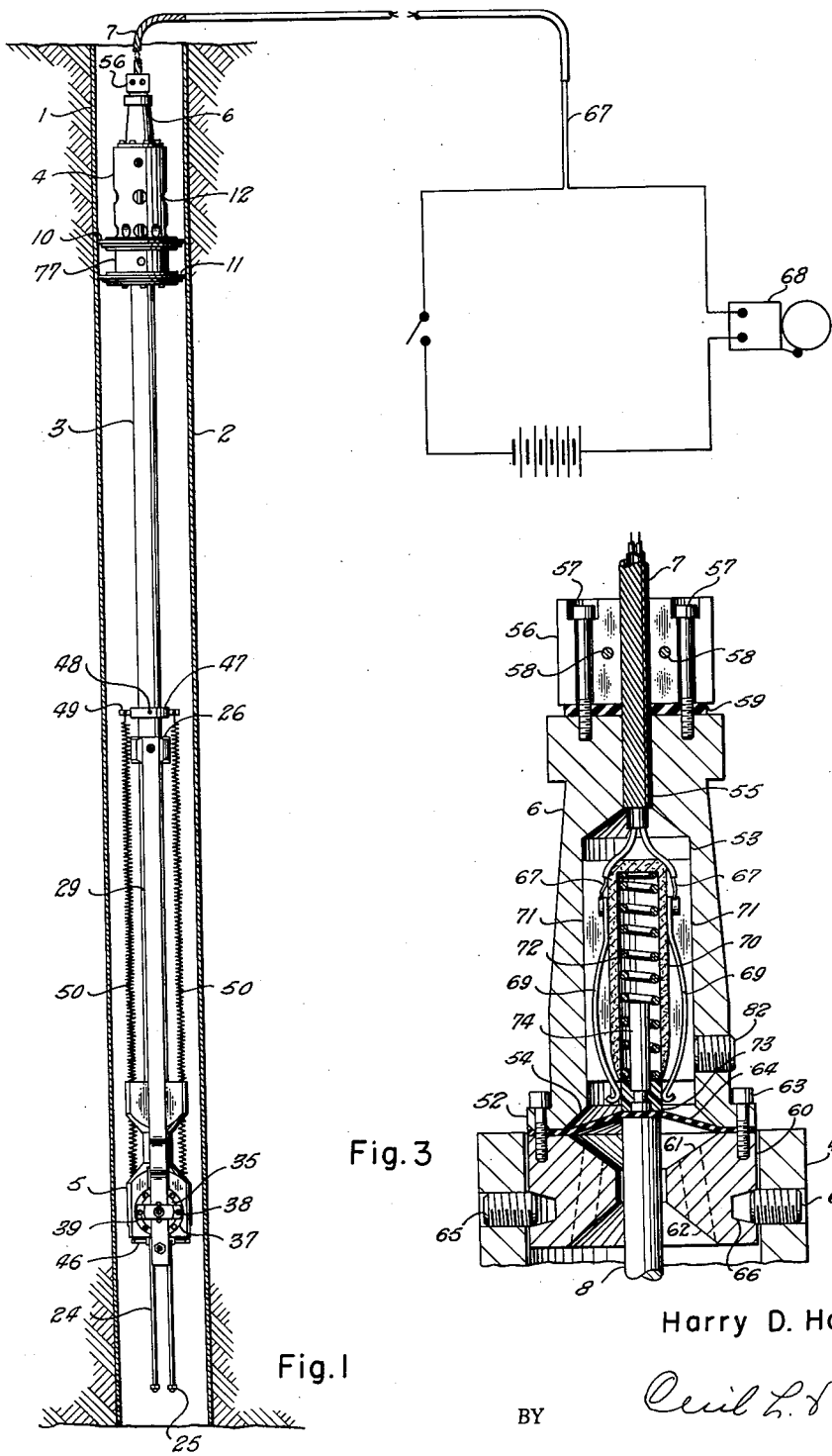
FIGURE 1 is a diagrammatic elevational view showing a device embodying the invention operatively positioned in an oil well casing, in place in a well bore.

Referring to the drawing, the numeral 1 designates a well bore, and the numeral 2 indicates a casing in place in the well bore 1.

The device of the invention includes an elongated, normally vertically disposed tubular barrel 3. A cylindrical element 4 is connected to the upper end of the barrel 3 and forms an upward extension thereof. An elongated valve housing 5 is connected to the lower end of the barrel 3 and forms a downward extension thereof. A switch housing 6, which is connected to the upper end of the cylindrical element 4, is clamped to an armored electric cable 7 whereby the device is capable of being suspended from the surface.

The barrel 3, the cylindrical element 4, and the valve housing 5 together form a tubular receptacle which is capable of being lowered in the casing 2, on the cable 7, to a predetermined elevation, or any desired level, and is adapted to receive a measured amount of well fluids entering the casing 2 through leaks occurring therein at a higher elevation.

An elongated valve stem 8 is arranged centrally of the barrel 3, the cylindrical element 4, and the valve housing 5, and normally extends beyond the ends thereof. A valve cup 9, which is connected to the valve stem 8 near its lower end, is receivable in the lower end of the valve housing 5, whereby the lower end of the valve housing 5 is normally closed.

The valve stem 8 is movable longitudinally relative to the tubular receptacle comprising the barrel 3, the cylindrical element 4, and the valve housing 5, whereby the valve cup 9 is capable of being displaced from the valve housing 5 to thereby dump the contents thereof.

A pair of resilient sealing rings 10 and 11 are connected to the cylindrical element 4 adjacent its lower end, and extend radially outwardly therefrom for sealing engagement with the casing 2. The sealing rings 10 and 11 are spaced apart from each other, and the arrangement is such that at least one of the sealing rings 10 and 11 will be positioned above or below the cavity normally existing between two adjoining sections of the casing 2 when the device is positioned opposite a collar connecting the sections.

A plurality of radially and longitudinally spaced side ports 12 are formed in the peripheral wall of the cylindrical element 4, above the sealing rings 10 and 11, whereby the interior of the tubular receptacle comprising the barrel 3, the cylindrical element 4, and the valve housing 5 is in fluid communication with the interior of the casing 2.

The cylindrical element 4 is open at its ends, and has a central bore 13, the lower end of which is of smaller diameter than its upper end. The upper end of the barrel 3 is received telescopically in the lower end of the cylindrical element 4, and is removably secured thereto by a plurality of set screws 14, which are inserted in circumferentially spaced threaded openings provided therefor in the cylindrical element 4.

The valve housing 5 is substantially "H" shaped in transverse section, and has planar surfaces 15 on two opposite sides thereof. Longitudinal slots 16 are formed in two other opposite sides of the valve housing 5, for use as spring guides as hereinafter described. An intermediate portion of the valve housing 5 is cut away, as at 17, to reduce its weight.

The valve housing 5 has a central bore 18, coextensive with its length, the diameter of which corresponds to that of the barrel 3. The lower end of the barrel 3 is received telescopically in the upper end of the bore 18, and is secured therein by a set screw 19, which is inserted in a threaded opening provided therefor in one of the planar sides 15 of the valve housing 5 and has a lock nut 20 applied to its outer end.

The lower end of the valve stem 8 is threaded. The valve cup 9, which is receivable in the lower end of the bore 18, surrounds the lower end of the valve stem 8 and is secured thereto by nuts 21, which are threaded on the valve stem 8, on opposite sides of the valve cup 9. An annular member 22 surrounds the lower end of the valve stem 8, and is positioned between the under side of the valve cup 9 and two of the nuts 21. The annular member 22 has a diameter larger than that of the bore 18, whereby it abuts the lower end of the valve housing 5 to limit the upward movement of the valve stem 8 relative to the valve housing 5.

A pair of diametrically opposed longitudinal grooves 23 are formed in the peripheral surface of the annular member 22. A pair of guide rods 24, which are each connected at one end to the lower end of the valve housing 5 and extend downwardly therefrom, in parallel relation to each other, are positioned on opposite sides of the annular member 22 and are engageable by the grooves 23. Nuts 25 are applied to the lower ends of the guide rods 24 for engagement by the annular member 22 to limit downward movement of the valve stem 8 relative to the valve housing 5.

A collar 26, which has planar surfaces 27 on opposite sides thereof, surrounds the barrel 3 and is removably connected thereto, above the valve housing 5 and in spaced apart relation thereto, by a pair of set screws 28, which are inserted in threaded openings provided therefor in two opposite sides 27 of the collar 26. The lastmentioned sides 27 of the collar 26 are arranged parallel to the planar sides 15 of the valve housing 5, and extend outwardly beyond them.

An elongated latch bar 29 is connected at its upper end to the collar 26, by one of the set screws 28, and depends therefrom. The latch bar 29 is bent at an obtuse angle intermediate its ends, whereby the lower portion thereof, which normally extends below the lower end of the valve stem 8, is biased inwardly and is normally positioned immediately adjacent one side of the annular member 22. A longitudinal groove 30 is formed in the adjacent planar surface 15 of the valve housing 5 for engagement by the lower portion of the latch bar 29.

A square headed bolt 31, which is inserted through an opening provided therefor in the latch bar 29, below the annular member 22 as shown in FIGURE 4, and has a nut 32 applied thereto, forms an abutment for engagement by the under side of the annular member 22 to secure the valve cup 9 in seating engagement with the bore 18.

A plurality of annular guide members 33 surround the valve stem 8 and are spaced longitudinally relative thereto, for use in centering the valve stem 8 relative to the bore 18. The guide members 33, like the valve cup 9, are formed of resilient material.

A circular port 34 is formed in one of the planar sides 15 of the valve housing 5, immediately above its lower end, opposite the lower portion of the latch bar 29. A flexible, circular diaphragm 35 extends across the port 34 and has its peripheral edge received in an annular recess 36 which is provided therefor in the adjacent planar surface 15, surrounding the port 34, and secured therein by a metal ring 37 and a plurality of circumferentially spaced screws 38, which are inserted in aligned openings provided therefor in the ring 37 and the recess 36.

A cross bar 39, which is bent angularly intermediate its ends whereby a middle portion thereof is offset laterally relative to its ends, has its ends secured in the recess 36, on opposite sides thereof, by two of the screws 38. The middle portion of the cross bar 39 extends outwardly beyond the adjacent planar surface 15, and overlies the latch bar 29.

A bolt 40, which is inserted through an opening provided therefor in the center of the diaphragm 35 and has a nut 41 and a washer 42 applied thereto, extends outwardly through a longitudinal slot 43 in the latch bar 29 and an opening 44 in the cross bar 39. A compression spring 45, which surrounds the bolt 40 and extends through the slot 43, acts on the nut 41 and the cross bar 39 to resist outward deflection of the diaphragm 35.

The strength of the spring 45 is such that the diaphragm 35 is deflected outwardly in response to the weight of a measured amount of well fluids collected in the tubular receptacle formed by the barrel 3, the cylindrical element 4, and the valve housing 5, so that the nut 41 engages the latch bar 29 to urge it outwardly, whereby the square headed bolt 31 is disengaged from the under side of the annular member 22, and the valve cup 9 is displaced from the valve housing 5, to thereby dump the fluids contained in the tubular receptacle.

The valve stem 8 is prevented from being rotated axially by engagement of the guide rods 24 with the longitudinal grooves 23 of the annular member 22.

A pair of horizontally disposed pins 46, which are received in threaded openings provided therefor in the peripheral surface of the annular member 22 and extend outwardly therefrom in opposite directions, are aligned vertically with the longitudinally slots 16 of the valve housing 5.

A collar 47 surrounds the barrel 3 and is connected thereto, above the collar 26, by a set screw 48. A pair of horizontally disposed pins 49, which are received in threaded openings provided therefor in the peripheral surface of the collar 47 and extend outwardly therefrom in opposite directions, are aligned vertically with the longitudinal slots 16 of the valve housing 5.

A pair of vertically disposed tension springs 50, which are positioned on opposite sides of the valve housing 5, are connected at their ends to the outer ends of the corresponding pins 46 and 49, and extend through the longitudinal slots 16 of the valve housing 5, which serve as guides therefor. The springs 50 bias the valve stem 8 upwardly, to thereby resist displacement of the valve cup 9 from the valve housing 5, and to return the valve cup 9 to its seated position in the bore 18 after the contents of the tubular receptacle formed by the barrel 3, the cylindrical element 4 and the valve housing 5 have been dumped.

The lower end of the latch bar 29 is beveled, as at 51, for abutment against the upper edge of the annular member 22, upon upward movement of the valve stem 8 in response to the action of the springs 50, to thereby cause the lower end of the latch bar 29 to be swung outwardly as necessary to permit the annular member 22 to pass the square headed bolt 31.

The switch housing 6 is circular in transverse section, and has a peripheral flange 52 at its lower end. The switch housing 6 has a central bore 53 beginning at its lower end, the lower end of the bore 53 being enlarged to form a downwardly and radially outwardly inclined wall surface 54. A central opening 55, which is formed in the upper end of the switch housing 6, communicates with the bore 53. One end of the armored electric cable 7 is passed through the opening 55.

One of two complementary, semi-cylindrical clamping members 56 partially encircles the cable 7 and is connected to the upper end of the switch housing 6 by a pair of bolts 57. The clamping members 56 are connected to each other, in clamping engagement with the cable 7, by a pair of bolts 58. A resilient gasket 59 is secured between the upper end of the switch housing 6 and the clamping members 56.

An annular closure member 60, which has a downwardly and radially inwardly inclined upper surface 61 and an upwardly and radially inwardly inclined lower surface 62 immediately adjacent the central opening therein, is secured to the peripheral flange 52 of the switch housing 6 by a plurality of bolts 63. A flexible diaphragm 64 extends across the lower end of the switch housing 6 and has its peripheral edge secured between the flange 52 and the closure member 60.

The closure member 60 is received in the upper end of the cylindrical element 4, and is secured therein by a plurality of circumferentially spaced set screws 65, which are inserted in threaded openings provided therefor in the cylindrical element 4 for engagement with a peripheral groove 66 formed in the closure member 60.

The valve stem 8, in its uppermost position, extends upwardly through the central opening of the closure member 60 and abuts the diaphragm 64, whereby the diaphragm 64 is deflected upwardly.

The cable 7 encloses a pair of lead wires 67, which may be connected in an electrical circuit which includes a signal device, such as the bell 68 shown, positioned at the surface. The adjacent ends of the lead wires 67 are connected within the switch housing 6 to a pair of elongated spring-like contact elements 69, which are connected to opposite sides of a cylindrical spring housing 70.

The spring housing 70 is disposed vertically in the switch housing 6, centrally thereof, and is separated therefrom by a pair of complementary non-conducting, semi-cylindrical spacer blocks 71. The spring housing 70 is formed of non-conducting material, and is closed at its upper end. The contact elements 69 are connected at one end to the spring housing 70 near its upper end, and depend therefrom. The lower ends of the contact elements 69 extend downwardly below the lower end of the spring housing 70, and are biased inwardly for engagement with a compression spring 72, which is disposed within the spring housing 70 and normally extends downwardly below it, to thereby close the electrical circuit including the bell 68.

A non-conducting plunger element 73, which has an upstanding pin 74 attached thereto for use as a spring guide, is disposed between the diaphragm 64 and the lower end of the spring 72, and is engaged between the lower ends of the contact elements 69, whereby the electrical circuit is broken, in the uppermost position of the valve stem 8, as shown in FIGURE 3. The arrangement is such that the bell 68 is energized upon dumping the fluid collected in the tubular receptacle formed by the barrel 3, the cylindrical element 4, and the valve housing 5, as above described.

As shown in FIGURE 2, the sealing rings 10 and 11 are connected to the cylindrical element 4, in spaced apart relation to each other, as hereinafter described. The cylindrical element 4 has a downwardly facing external shoulder 75 which is spaced above its lower end. The uppermost sealing ring 10, which consists of two layers of resilient sheet material, is disposed between two annular sheet metal plates 76, which surround the cylindrical element 4 and are positioned immediately below the shoulder 75. A collar 77 surrounds the cylindrical element 4 and is positioned immediately below the plates 76. The collar 77 has openings 78 therein opposite the set screws 14, which are headless. The lowermost sealing ring 11, which consists of a single layer of resilient sheet material, is disposed between two annular sheet metal plates 79, which surround the cylindrical element 4 and are positioned immediately below the collar 77. An annular sheet metal plate 80, which surrounds the barrel 3, is connected to the lower end of the cylindrical element 4, by circumferentially spaced screws 81, and extends radially outwardly therefrom, below the plates 79, for clamping engagement therewith.

A threaded plug 82 is removably inserted in an opening provided therefor in the side wall of the switch housing 6 near its lower end. The switch housing 6 advantageously may be filled with a non-conducting fluid.

The invention may be modified in various ways without departing from the spirit and scope thereof.

What is claimed is:

1. A device for detecting leaks in oil well casing in a well bore, a tubular receptacle having a valve stem disposed concentrically thereof and extending beyond its ends and movable longitudinally thereof, a valve cup on the lower end of said valve stem adapted to close said receptacle and retain fluid therein, an armored electric cable attached to the upper end of said receptacle whereby the latter is suspended in the casing at predetermined levels, fluid ports in the upper end of said receptacle, sealing means externally of said receptacle below said ports engaging the said casing whereby fluids leaking into said casing above said ports enter said receptacle therethrough, a latch bar on said receptacle engaging said valve cup to retain the same in seated engagement with the receptacle, fluid actuated means in said receptacle for releasing said latch bar and said cup when a predetermined amount of fluid is collected in said receptacle to dump said fluid, an electrical switch responsive to longitudinal movement of said valve stem to close an electrical circuit transmitting a signal through said cable to the surface when said latch bar is released and spring means biasing said valve stem and valve cup upwardly to close said receptacle after the contents thereof are dumped while also resetting said latch bar.

2. In a device as described in claim 1 wherein the fluid actuated latch bar releasing means in said receptacle comprises a diaphragm connected to the lower end of said latch bar and yieldable to fluid pressure in said receptacle, and a spring normally biasing said diaphragm inwardly against said receptacle to retain said latch bar in latched position on said cup.

3. A device for detecting leaks in oil well casing in a well bore, comprising a normally vertically disposed elongated tubular receptacle having an elongated valve stem disposed centrally thereof and extending beyond its ends, and a valve cup attached to the valve stem and receivable in the lower end of the receptacle for closing the same, a cylindrical element fixed to the upper end of said receptacle and having ports therein, an armored electric cable connected to the upper end of the cylindrical element whereby the receptacle is suspended in the casing at predetermined elevations and sealing means below said ports engageable with the casing for sealing said receptacle to receive through said ports a measured amount of well fluids entering the casing through leaks occurring therein at a higher elevation, the valve stem being movable longitudinally relative to the receptacle whereby the valve cup is displaced from the receptacle to thereby dump the contents thereof, a tensioned latch bar normally acting on the valve stem to retain the valve cup in seating engagement with the receptacle, diaphragm-actuated latch releasing means in the lower end of said receptacle engageable with said latch bar and responsive to the weight of a column of fluid in the receptacle for releasing the latch bar when a measured amount of fluid has been collected in the receptacle, switch means responsive to longitudinal movement of the valve stem for closing an electrical circuit whereby a signal is transmitted to the surface through the cable, upon releasing the latch bar, and spring means acting on the valve stem to bias it upwardly relative to the receptacle to thereby return the valve cup to its seated position in the receptacle after the contents thereof have been dumped, while at the same time acting on the latch bar to reset it.

References Cited in the file of this patent

UNITED STATES PATENTS

| | | |
|---|---|---|
| 1,652,472 | Erwin et al. | Dec. 13, 1927 |
| 2,564,198 | Elkins | Aug. 14, 1951 |